United States Patent
Mantell et al.

(10) Patent No.: US 11,040,487 B2
(45) Date of Patent: Jun. 22, 2021

(54) METHOD FOR OPERATING AN EXTRUDER IN A THREE-DIMENSIONAL (3D) OBJECT PRINTER TO IMPROVE LAYER FORMATION

(71) Applicant: Xerox Corporation, Norwalk, CT (US)

(72) Inventors: David A. Mantell, Rochester, NY (US); Peter J. Nystrom, Webster, NY (US); Christopher G. Lynn, Wolcott, NY (US); Jason O'Neil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/366,041

(22) Filed: Mar. 27, 2019

(65) Prior Publication Data

US 2020/0307081 A1 Oct. 1, 2020

(51) Int. Cl.
| | |
|---|---|
| *B29C 64/209* | (2017.01) |
| *B29C 64/321* | (2017.01) |
| *B29C 64/118* | (2017.01) |
| *B33Y 30/00* | (2015.01) |
| *B33Y 40/00* | (2020.01) |

(52) U.S. Cl.
CPC .......... *B29C 64/209* (2017.08); *B29C 64/118* (2017.08); *B29C 64/321* (2017.08); *B29C 2948/926* (2019.02); *B29C 2948/92904* (2019.02); *B33Y 30/00* (2014.12); *B33Y 40/00* (2014.12)

(58) Field of Classification Search
CPC .... B29C 64/171; B29C 64/176; B29C 64/182
See application file for complete search history.

(56) References Cited

U.S. PATENT DOCUMENTS

| | | |
|---|---|---|
| 6,129,872 A | 10/2000 | Jang |
| 6,238,613 B1 | 5/2001 | Batchedlder et al. |

(Continued)

FOREIGN PATENT DOCUMENTS

| | | |
|---|---|---|
| EP | 3 311 989 A1 | 4/2018 |
| WO | 2014/200595 A2 | 12/2014 |

(Continued)

OTHER PUBLICATIONS

3ders.org; New 3-way extruder and color blending nozzle developed for multi-colour/material 3D printing; 3D Printing Technology; Aug. 25, 2012; 11 Pages; www.3ders.org.

(Continued)

*Primary Examiner* — Timothy Kennedy
(74) *Attorney, Agent, or Firm* — Maginot Moore & Beck LLP

(57) ABSTRACT

An additive manufacturing system opens the valves in an extruder needed to form a swath and operates an actuator to move the extruder through a transition region with those valves open to establish an amount of extrusion material between a faceplate of the extruder and a portion of an object being formed that is adequate for formation of a swath. The length of the transition region is determined with reference to a viscosity of the material being extruded and a speed at which the extruder is moved to form the swath. The transition region can be perpendicular to a path of the extruder to form the swath or aligned with the path of the extruder to form the swath.

13 Claims, 6 Drawing Sheets

(56) References Cited

U.S. PATENT DOCUMENTS

| | | |
|---|---|---|
| 6,593,053 B1 | 7/2003 | Chang et al. |
| 6,773,249 B1 | 8/2004 | Przytulla et al. |
| 7,604,470 B2 | 10/2009 | LaBossiere et al. |
| 7,765,949 B2 | 8/2010 | Fork et al. |
| 8,801,415 B2 | 8/2014 | Khoshnevis |
| 8,827,684 B1 | 9/2014 | Schumacher et al. |
| 9,757,900 B2 | 9/2017 | Nystrom et al. |
| 9,993,964 B2 | 6/2018 | Mantell |
| 2004/0141018 A1 | 7/2004 | Silverbrook |
| 2004/0164436 A1 | 8/2004 | Khoshnevis |
| 2004/0253365 A1 | 12/2004 | Warren et al. |
| 2010/0171792 A1* | 7/2010 | Sidhu .................. B29C 64/106 347/44 |
| 2014/0039659 A1 | 2/2014 | Boyer et al. |
| 2014/0048969 A1 | 2/2014 | Swanson et al. |
| 2014/0121813 A1 | 5/2014 | Schmehl |
| 2014/0242208 A1 | 8/2014 | Esworthy |
| 2014/0291886 A1 | 10/2014 | Mark et al. |
| 2014/0328964 A1 | 11/2014 | Mark et al. |
| 2014/0363532 A1 | 12/2014 | Wolfgram |
| 2014/0368568 A1 | 12/2014 | Kodama et al. |
| 2015/0035198 A1 | 2/2015 | Saba |
| 2015/0056432 A1 | 2/2015 | Solberg |
| 2015/0077215 A1 | 3/2015 | Ranky et al. |
| 2015/0093468 A1 | 4/2015 | Page |
| 2015/0306823 A1 | 10/2015 | Askedall et al. |
| 2016/0136897 A1 | 5/2016 | Nielsen-Cole et al. |
| 2016/0325498 A1 | 11/2016 | Gelbert |
| 2016/0346997 A1 | 12/2016 | Lewis et al. |
| 2016/0361875 A1* | 12/2016 | Wu ...................... B29C 64/245 |
| 2017/0157828 A1 | 6/2017 | Mandel et al. |
| 2017/0157831 A1 | 6/2017 | Mandel et al. |
| 2017/0157843 A1 | 6/2017 | Nystrom et al. |
| 2017/0157844 A1 | 6/2017 | Mandel et al. |
| 2017/0173868 A1 | 6/2017 | Mark |
| 2017/0334137 A1 | 11/2017 | Nystrom et al. |
| 2018/0111306 A1 | 4/2018 | Mandel et al. |
| 2018/0111308 A1 | 4/2018 | Mantell et al. |
| 2018/0111336 A1 | 4/2018 | Mantell et al. |

FOREIGN PATENT DOCUMENTS

| | | |
|---|---|---|
| WO | 2015027938 A1 | 3/2015 |
| WO | 2015077262 A1 | 5/2015 |

OTHER PUBLICATIONS

Sure Tack Systems; Automatic Adhesive Applicator Equipment; Brochure; 2018; 3 Pages; https://suretacksystems.com/products/automatic-applicators/.

Francis X. Govers III; Diamond Hotend makes multi-color 3D printing possible from a single nozzle; Gizmag; Apr. 12, 2015; 6 Pages; www.gizmag.com.

Sure Tack Systems; HA2 Series Extrusion Hot Melt Applicator; Brochure; 2018; 4 Pages; https://suretacksystems.com/extrusion.

Nscrypt, Inc.; World-wide Leader in Micro to Pico-liter Dispensing Systems with our Patented Micro Dispense Pump; nScrypt, Inc.; 2001-2012; 3 Pages; www.nscrypt.com.

e3d-online.com; Multi-Extrusion; E3D-ONLINE; 2014; 6 Pages; www.e3d-online.com/Multi-Extrusion.

Simplify 3D; Printing with Multiple Extruders; Jul. 23, 2015; 5 Pages; www.simplify3d.com/support/tutorials.

Isaac Budmen; Understanding Shells, Layer Height and Infill; Team Budmen; Sep. 2013; 1 Page; www.blog.teambudmen.com.

European Search Report corresponding to European Patent Application No. EP 20 16 4050, dated Aug. 14, 2020 (8 pages).

* cited by examiner

METHOD FOR OPERATING AN EXTRUDER IN A THREE-DIMENSIONAL (3D) OBJECT PRINTER TO IMPROVE LAYER FORMATION

TECHNICAL FIELD

This disclosure is directed to extruders used in three-dimensional (3D) object printers and, more particularly, to operation of the valves in such extruders.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use extruders that soften or melt extrusion material, such as ABS plastic, into thermoplastic material and then emit the thermoplastic material in a predetermined pattern. The printer typically operates the extruder to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

In some extruders used in 3D additive manufacturing systems, valves are positioned in the thermoplastic material within the extruder and these valves are operated to start and stop flow through the multiple nozzles extending through a common faceplate of the extruder. Operating these valves can cause issues with the reliability of the thermoplastic material flow from the nozzle or nozzles of the extruder. In some extruders, operating a valve to retract the valve member and to enable thermoplastic material flow through a nozzle can pull some of the material back into the extruder and operating a valve to push the valve member into the flow to stop the flow through the nozzle can push some of the material out of the nozzle. Additionally, the amount and location of material between the faceplate of the extruder and the layer to which the material is being applied is critical for accurate object formation. The extruder can be lifted to avoid wiping material from the faceplate onto previously printed layers but when the extruder is returned to a position to resume extrusion for an object layer, the amount of material on the faceplate cannot be accurately known. Operating the extruder to enable more accurate identification of the amount of material on the faceplate would be beneficial for improving part formation and quality.

SUMMARY

A new method of operating a multi-nozzle extruder enables an adequate amount of thermoplastic material for swath formation to be established between a faceplate of the extruder and a portion of the object being formed before the extruder reaches the start position for formation of a swath in a layer of the object. The method includes identifying with a controller a swath to be formed that requires closing of all valves in an extruder and lifting of the extruder for movement of the extruder to a start position for formation of the swath, identifying with the controller a transition region start position that is offset from the start position for the swath and is positioned within a perimeter of an object being formed by the 3D object manufacturing system, operating at least one actuator with the controller to move the extruder to the transition region start position, opening with the controller valves in the extruder that are identified by extruder path control data for formation of the swath to be formed, and operating the at least one actuator with the controller to move the extruder from the transition region start position to the start position for the swath to fill a volume between a faceplate of the extruder and the portion of the object being formed by the 3D manufacturing system at the start position for the swath.

A new 3D object manufacturing system implements the method of operating a multi-nozzle extruder that enables an adequate amount of thermoplastic material for swath formation to be established between the faceplate of the extruder and a portion of the object being formed before the extruder reaches the start position for formation of the swath. The system includes an extruder having a plurality of nozzles in a common faceplate and a plurality of values operatively connected to the nozzles in a one-to-one correspondence, the valves being configured to open and close selectively the nozzle to which each valve is operatively connected, at least one actuator operatively connected to the extruder, the at least one actuator being configured to lift and move the extruder, and a controller operatively connected to the extruder and the valves in the plurality of valves in a manner that enables independent control of the valves. The controller is configured to identify a swath to be formed that requires closing of all valves in an extruder and lifting of the extruder for movement of the extruder to a start position for formation of the swath, identify a transition region start position that is offset from the start position for the swath and is positioned within a perimeter of an object, operate the at least one actuator to move the extruder to the transition region start position, open at least one valve in the extruder that is identified by extruder path control data for formation of the swath, and operate the at least one actuator to move the extruder from the transition region start position to the start position for the swath to fill a volume between a faceplate of the extruder and the portion of the object being formed by the 3D manufacturing system at the start position for the swath.

BRIEF DESCRIPTION OF THE DRAWINGS

The foregoing aspects and other features of operating a multi-nozzle extruder to enable an adequate amount of thermoplastic material for swath formation to be established between the faceplate of an extruder and a portion of the object being formed before the extruder reaches the start position for formation of a swath are explained in the following description, taken in connection with the accompanying drawings.

DETAILED DESCRIPTION

Figure 1:
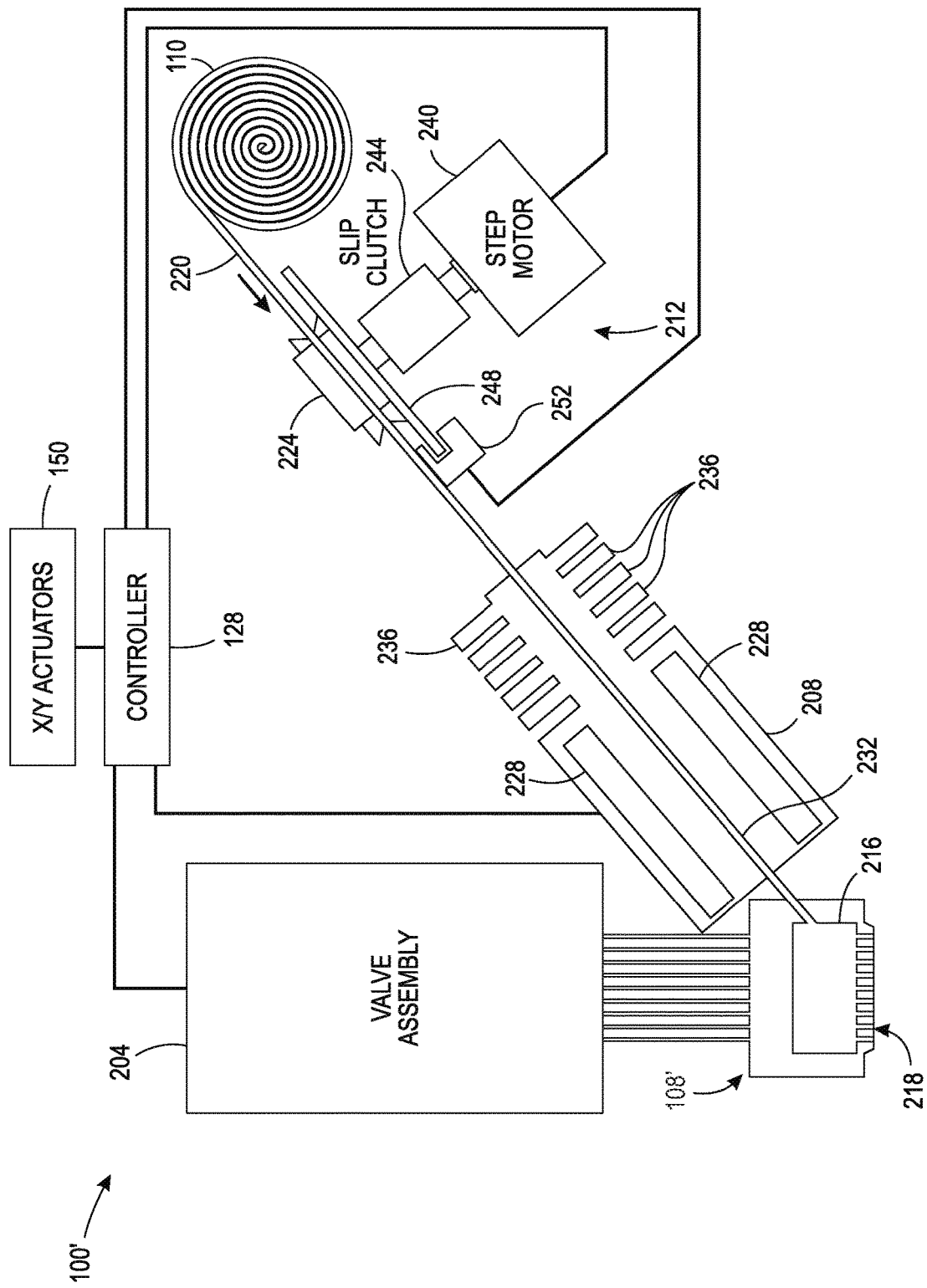
FIG. 1 depicts an additive manufacturing system that operates a multi-nozzle extruder to enable thermoplastic material flow to be established before the extruder reaches the start position for formation of a swath.

For a general understanding of the environment for the device disclosed herein as well as the details for the device, reference is made to the drawings. In the drawings, like reference numerals designate like elements.

In multi-nozzle extruders, the nozzles are arranged in a common faceplate and the movement of the faceplate, the orientation of the faceplate, and the amount of material on the faceplate with reference to the build platform are critical to the formation of a swath. As used in this document, a "swath" refers to the extrusion of material from any opened nozzle in a multi-nozzle extruder as an aggregate as long as at least one nozzle remains open and material is extruded from any opened nozzle. That is, even if multiple nozzles are opened, but not all of the emitted extrusions contact one another, the discrete extrusions constitute a swath. A contiguous swath is one in which all of the extrusions from multiple nozzles are in contiguous contact across the swath in a cross-process direction.

Figure 6:
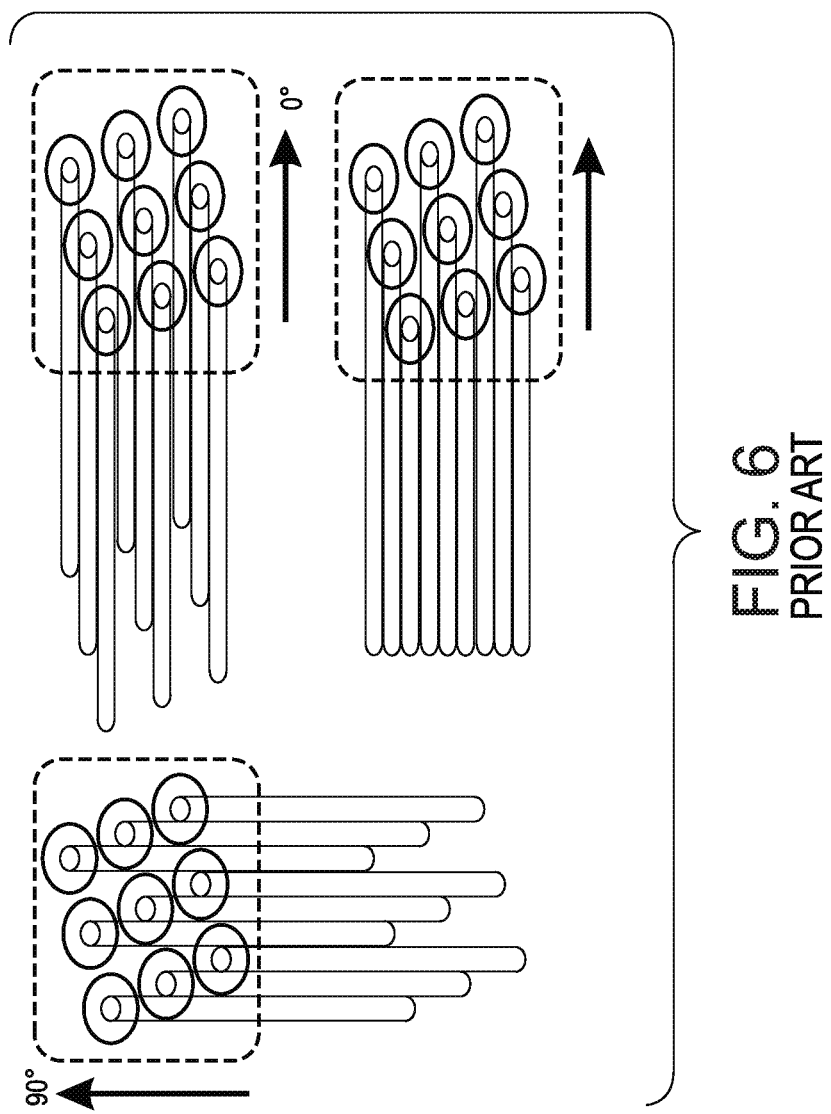
FIG. 6 depicts swaths that can be formed by a prior art nine nozzle faceplate when oriented at 0° and 90°.

Within a layer of an object being formed are surface regions, transition regions, and interior regions. The interior regions of an object can be sparsely filled since they are not observable. These regions must have enough structure and rigidity that they can support transition and surface structures that need to be formed over the interior regions. Additionally, having these interior regions contribute to the overall rigidity of the object is advantageous. Finding an appropriate balance between the amount of extruded material required in these different types of regions is important in object manufacture. In manufacturing systems that form objects with a multi-nozzle extruder, the extruder can be moved along the 0°-180° (X) axis or the 90°-270° (Y) axis, as shown in FIG. 6. Extruding along these axes enable all nine nozzles of the depicted extruder to contribute to the formation of a contiguous swath and the swath has its greatest width. As used in this document, the term "0°-180° axis" means movement in either the 0° direction or the 180° direction with the faceplate of the extruder oriented so if all of the nozzles are open, then the most efficiently produced contiguous swath that the extruder can produce is formed and the term "90°-270° axis" means movement in either the 90° or the 270° direction with the faceplate of the extruder oriented so if all of the nozzles are open, then the most efficiently produced contiguous swath that the extruder can produce is formed. The contiguous swath is produced efficiently because all of the nozzles are equally spaced apart perpendicular to the direction of movement. For solidly filling an interior region, the extruder can be moved bidirectionally in the 0° direction for one layer and bidirectionally in the 90° direction in the next layer.

As used herein, the term "extrusion material" refers to a material that is typically softened or melted to form thermoplastic material to be emitted by an extruder in an additive manufacturing system. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, and any other form of material that can be thermally treated to produce thermoplastic material suitable for emission through an extruder. Examples of support materials include, but are not limited to, high-impact polystyrene (HIPS), polyvinyl alcohol (PVA), and other materials capable of extrusion after being thermally treated. Extrusion materials also include materials other than thermoplastic polymers, such as chocolate. In some extrusion printers, the extrusion material is supplied as continuous elongated length of material commonly known as a "filament." This filament is provided in a solid form by one or more rollers pulling the extrusion material filament from a spool or other supply and feeding the filament into a heater that is fluidly connected to a manifold within the extruder. Although the illustrated examples use extrusion material that is supplied as filament to the heaters, other extrusion material supplies can be used, such as particulate or pellet extrusion materials. The heater softens or melts the extrusion material filament to form a thermoplastic material that flows into the manifold. When a valve positioned between a nozzle and the manifold is opened, a portion of the thermoplastic material flows from the manifold through the nozzle and is emitted as a stream of thermoplastic material. As used herein, the term "melt" as applied to extrusion material refers to any elevation of temperature for the extrusion material that softens or changes the phase of the extrusion material to enable extrusion of the thermoplastic material through one or more nozzles in an extruder during operation of a three-dimensional object printer. The melted extrusion material is also denoted as "thermoplastic material" in this document. As those of skill in the art recognize, certain amorphous extrusion materials do not transition to a pure liquid state during operation of the printer and some extrusion materials do not need to be heated to be extrudable, such as some food materials.

As used herein, the terms "extruder" refers to a component of a printer that contains extrusion material in a single fluid chamber and provides the extrusion material to a manifold connected to one or more nozzles extending through a common faceplate. Some extruders include a valve assembly that can be electronically operated to enable thermoplastic material to flow through nozzles selectively. The valve assembly enables the one or more nozzles to be connected to the manifold independently to extrude the thermoplastic material. As used herein, the term "nozzle" refers to an orifice in an extruder that is fluidly connected to the manifold in an extruder and through which thermoplastic material is emitted towards a material receiving surface. During operation, the nozzle can extrude a substantially continuous linear swath of the thermoplastic material along the process path of the extruder. A controller operates the valves in the valve assembly to control which nozzles connected to the valve assembly extrude thermoplastic material. The diameter of the nozzle affects the width of the line of extruded thermoplastic material. Different extruder embodiments include nozzles having a range of orifice sizes with wider orifices producing lines having widths that are greater than the widths of lines produced by narrower orifices.

As used herein, the term "manifold" refers to a cavity formed within a housing of an extruder that holds a supply of thermoplastic material for delivery to one or more nozzles in the extruder during a three-dimensional object printing operation. As used herein, the term "swath" refers to any pattern of the extrusion material that the extruder forms on a material receiving surface during a three-dimensional object printing operation. Common swaths include straight-line linear arrangements of extrusion material and curved swaths. In some configurations, the extruder extrudes the thermoplastic material in a continuous manner to form the swath with a contiguous mass of the extrusion material in both process and cross-process directions, while in other configurations the extruder operates in an intermittent manner to form smaller groups of thermoplastic material that are arranged along a linear or curved path. The three-dimensional object printer forms various structures using combinations of different swaths of the extrusion material. Additionally, a controller in the three-dimensional object printer uses object image data and extruder path data that correspond to different swaths of extrusion material prior to operating the extruder to form each swath of extrusion material. As described below, the controller optionally adjusts the operation of the valve assembly and the speed at which the extruder is moved to form multiple swaths of thermoplastic material through one or more nozzles during a three-dimensional printing operation.

As used herein, the term "process direction" refers to a direction of relative movement between an extruder and a material receiving surface that receives thermoplastic material extruded from one or more nozzles in the extruder. The material receiving surface is either a support member that holds a three-dimensional printed object or a surface of the partially formed three-dimensional object during an additive manufacturing process. In the illustrative embodiments described herein, one or more actuators move the extruder about the support member, but alternative system embodiments move the support member to produce the relative motion in the process direction while the extruder remains stationary. Some systems use a combination of both systems for different axes of motion.

As used herein, the term "cross process direction" refers to an axis that is perpendicular to the process direction and parallel to the extruder faceplate and the material receiving surface. The process direction and cross-process direction refer to the relative path of movement of the extruder and the surface that receives the thermoplastic material. In some configurations, the extruder includes an array of nozzles that can extend in the process direction, the cross-process direction, or both. Adjacent nozzles within the extruder are separated by a predetermined distance in the cross-process direction. In some configurations, the system rotates the extruder to adjust the cross-process direction distance that separates different nozzles in the extruder to adjust the corresponding cross-process direction distance that separates the lines of thermoplastic material that are extruded from the nozzles in the extruder as the lines form a swath.

During operation of the additive manufacturing system, an extruder moves in the process direction along both straight and curved paths relative to a surface that receives thermoplastic material during the three-dimensional object printing process. Additionally, an actuator in the system optionally rotates the extruder about the Z axis to adjust the effective cross-process distance that separates nozzles in the extruder to enable the extruder to form two or more lines of thermoplastic material with predetermined distances between each line of the thermoplastic material. The extruder moves both along the outer perimeter to form outer walls of a two-dimensional region in a layer of the printed object and within the perimeter to fill all or a portion of the two-dimensional region with the thermoplastic material.

Figure 5:
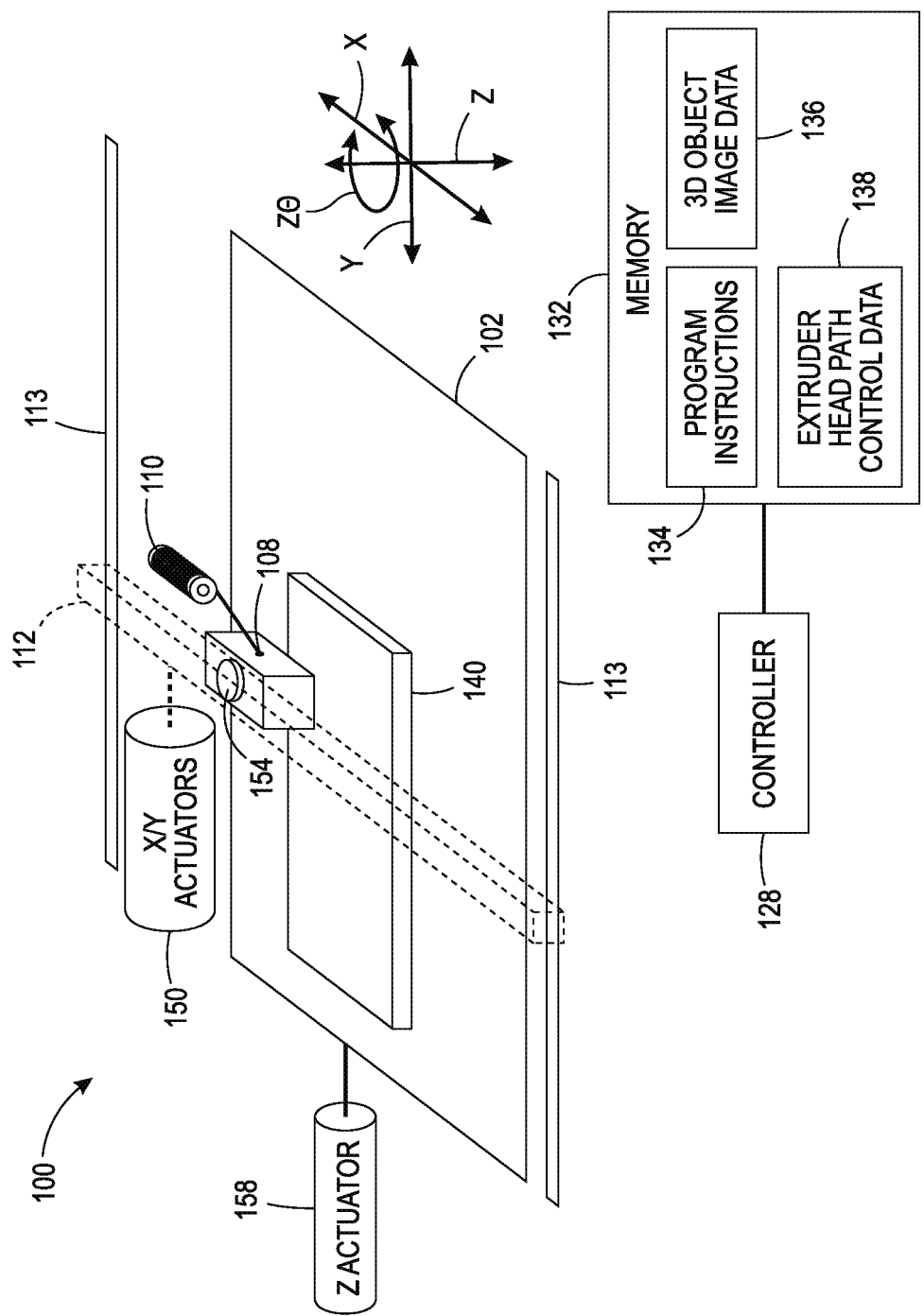
FIG. 5 depicts a prior art three-dimensional object additive manufacturing system or printer 100 that is configured to operate an extruder 108 to form a three-dimensional printed object 140.

FIG. 5 depicts a prior art three-dimensional object additive manufacturing system or printer 100 that is configured to operate an extruder 108 to form a three-dimensional printed object 140. The printer 100 includes a support member 102, a multi-nozzle extruder 108, extruder support arm 112, controller 128, memory 132, X/Y actuators 150, an optional Zθ actuator 154, and a Z actuator 158. In the printer 100, the X/Y actuators 150 move the extruder 108 to different locations in a two-dimensional plane (the "X-Y plane") along the X and Y axes to extrude swaths of thermoplastic material that form one layer in a three-dimensional printed object, such as the object 140 that is depicted in FIG. 5. For example, in FIG. 5 the X/Y actuators 150 translate the support arm 112 and extruder 108 along guide rails 113 to move the arm and extruder along the Y axis while the X/Y actuators 150 translate the extruder 108 along the length of the support arm 112 to move the extruder along the X axis. The extruded patterns include both outlines of one or more regions in the layer and swaths of the thermoplastic material that fill the regions within the outline of thermoplastic material patterns. The Z actuator 158 controls the distance between the extruder 108 and the support member 102 along the Z axis to ensure that the nozzles in the extruder 108 remain at a suitable height to extrude thermoplastic material onto the object 140 as the object is formed during the printing process. The Zθ actuator 154 controls an angle of rotation of the extruder 108 about the Z axis for some embodiments of the extruder 108 that rotate about the Z axis. This movement controls the process and cross-process separation between nozzles in the extruder 108, although some extruders do not require rotation during the manufacturing process. In the system 100, the X/Y actuators 150, Zθ actuator 154, and the Z actuator 158 are embodied as electromechanical actuators, such as electric motors, stepper motors, or any other suitable electromechanical device. In the printer of FIG. 5, the three-dimensional object printer 100 is depicted during formation of a three-dimensional printed object 140 that is formed from a plurality of layers of thermoplastic material.

The support member 102 is a planar member, such as a glass plate, polymer plate, or foam surface, which supports the three-dimensional printed object 140 during the manufacturing process. In the embodiment of FIG. 5, the Z actuator 158 also moves the support member 102 in the Z direction away from the extruder 108 after application of each layer of thermoplastic material to ensure that the extruder 108 maintains a predetermined distance from the upper surface of the object 140. The extruder 108 includes a plurality of nozzles and each nozzle extrudes thermoplastic material onto the surface of the support member 102 or a surface of a partially formed object, such the object 140. In the example of FIG. 5, extrusion material is provided as a filament from extrusion material supply 110, which is a spool of ABS plastic or another suitable extrusion material filament that unwinds from the spool to supply extrusion material to the extruder 108.

The support arm 112 includes a support member and one or more actuators that move the extruder 108 during printing operations. In the system 100, one or more actuators 150 move the support arm 112 and extruder 108 along the X and Y axes during the printing operation. For example, one of the actuators 150 moves the support arm 112 and the extruder 108 along the Y axis while another actuator moves the extruder 108 along the length of the support arm 112 to move along the X axis. In the system 100, the X/Y actuators 150 optionally move the extruder 108 along both the X and Y axes simultaneously along either straight or curved paths. The controller 128 controls the movements of the extruder 108 in both linear and curved paths that enable the nozzles in the extruder 108 to extrude thermoplastic material onto the support member 102 or onto previously formed layers of the object 140. The controller 128 optionally moves the extruder 108 in a rasterized motion along the X axis or Y axis, but the X/Y actuators 150 can also move the extruder 108 along arbitrary linear or curved paths in the X-Y plane.

The controller 128 is a digital logic device such as a microprocessor, microcontroller, field programmable gate array (FPGA), application specific integrated circuit (ASIC) or any other digital logic that is configured to operate the printer 100. As used in this document, the term "controller" means one or more controllers, processors, or computers configured with programmed instructions to form a plurality of tasks to achieve a function. Thus, a controller for a printer can be multiple controllers that operate the extruder, move the extruder, process the object data, and optimize the filling of regions within an object being manufactured, as well as other tasks and functions. In the printer 100, the controller 128 is operatively connected to one or more actuators that control the movement of the support member 102 and the support arm 112. The controller 128 is also operatively connected to a memory 132. In the embodiment of the printer 100, the memory 132 includes volatile data storage devices, such as random access memory (RAM) devices, and non-volatile data storage devices such as solid-state data storage devices, magnetic disks, optical disks, or any other suitable data storage devices. The memory 132 stores programmed instruction data 134 and three-dimensional (3D) object image data 136. The controller 128 executes the stored program instructions 134 to operate the components in the printer 100 to form the three-dimensional printed object 140 and print two-dimensional images on one or more surfaces of the object 140. The 3D object image data 136 includes, for example, data defining cross-sectional views of an object on a layer-by-layer basis. Each data layer represents a layer of thermoplastic material that the printer 100 forms during the three-dimensional object printing process. The extruder path control data 138 include sets of geometric data or actuator control commands that the controller 128 processes to control the path of movement of the extruder 108 using the X/Y actuators 150 and to control the orientation of the extruder 108 using the Zθ actuator 154. The controller 128 operates the actuators to move the extruder 108 above the support member 102 as noted above while the extruder extrudes thermoplastic material to form an object.

FIG. 1 depicts an additive manufacturing system 100' having an extruder 108' that extrudes a plurality of thermoplastic materials through apertures in a faceplate. Although the printer 100' is depicted as a printer that uses planar motion to form an object, other printer architectures can be used with the extruder and the controller configured to regulate speed of the extruder with reference to the angular orientation of the extruder as described in this document. These architectures include delta-bots, selective compliance assembly robot arms (SCARAs), multi-axis printers, non-Cartesian printers, and the like. The motions in these alternative embodiments still have process and cross-process directions as defined above and the nozzle spacing in the extruders of these embodiments still define the nozzle spacing with respect to the cross-process direction. Only one manifold 216 is shown in FIG. 1 to simplify the figure, but the extruder 108' can have a plurality of manifolds 216. In one embodiment, each manifold 216 in the extruder 108' is operatively connected to a different heater 208 that is fed by a different extrusion material supply 110 in a one-to-one correspondence. Alternatively, each manifold 216 can be coupled to a single heater 208' that houses a plurality of channels 232' that are fed by a plurality of extrusion material supplies 110 as shown in the embodiment 100" of FIG. 2. Each channel 232' in FIG. 2 supplies thermoplastic material to a manifold 216 in the extruder 108" to enable each manifold to receive a material that is different than a material that the other manifolds are receiving. In the extruder 108", each nozzle 218 is fluidly connected to only one of the manifolds within the extruder 108" so each nozzle can extrude a thermoplastic material that is different than the materials extruded from nozzles connected to other manifolds. Extrusion from each nozzle is selectively and independently activated and deactivated by controller 128 operating the valves in the valve assembly 204. Each nozzle 218 is also aligned with an aperture in a faceplate 260 to configure the nozzles for more flexible formation of swaths of the materials in an object.

Figure 2:
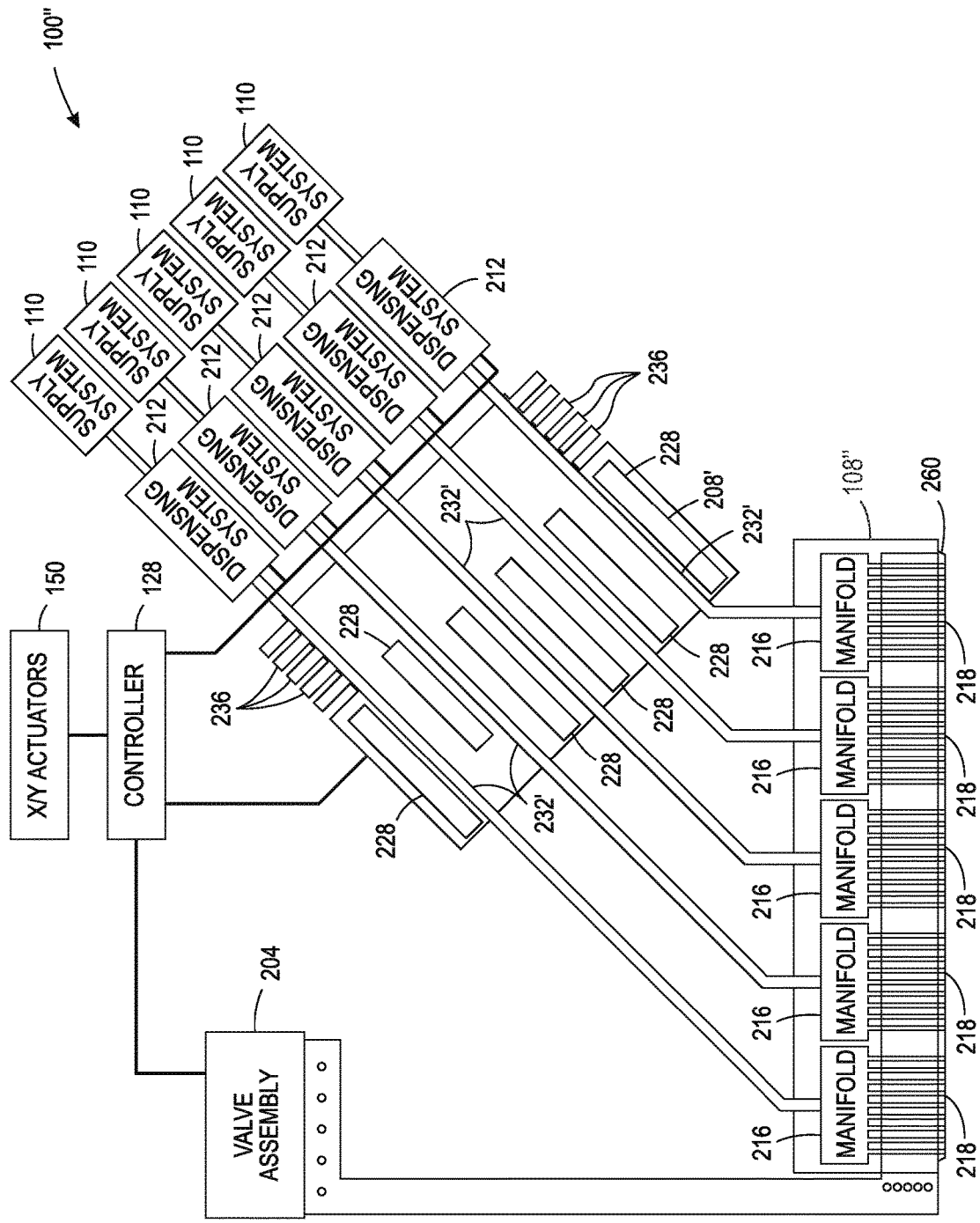
FIG. 2 depicts an alternative embodiment of an additive manufacturing system that operates a multi-nozzle extruder to enable thermoplastic material flow to be established before the extruder reaches the start position for formation of a swath.

In the embodiments of FIG. 1 and FIG. 2, a valve assembly 204 positions a valve between the manifolds in the extruder 108' or 108" and each of the nozzles connected to the manifold(s) in the extruders 108' or 108". The valve assembly 204 is operatively connected to the controller 128 so the controller can open and close the valves for extruding thermoplastic material from the plurality of nozzles in the extruders 108' or 108". Specifically, the controller 128 activates and deactivates different actuators in the assembly 204 connected to the valves in the extruders 108' or 108" to extrude thermoplastic material from the nozzles and form swaths of different thermoplastic materials in each layer of a three-dimensional printed object, such as object 140 in FIG. 6.

One embodiment of system 100' includes a program known as a slicer. This program is usually executed by another processor in system 100' (not shown). The slicer generates the 3D object image data used to operate the components of the printer from data the slicer receives that defines the object to be produced in one of a number of known formats. A commonly used format is the STL format but other formats, such as 3MF, AMF, and PLY can be used. In the STL format, an object surface is defined by the edges and corners of triangular faces. The slicer converts these STL data into extruder path control data for forming two-dimensional (2D) horizontal slices of the object. This conversion, in one embodiment, results in g-code, which initializes the printing system and defines the paths along which the extruder is moved while extruding thermoplastic material to form the layers. This type of extrusion additive manufacturing system is sometime also known as a vector-graphic printer.

To control operation of the valves in a multi-extruder system, such as system 100' and 100", the g-code produced by the slicer implemented by controller 128 has been extended to include a parameter that identifies the valves to be open during a move. An example of an extended g-code line has the following form: G1 P511 X100 Y100 E1.5

F4500. In this example, G1 identifies the line as being for move and extrude operation, P511 is the parameter that identifies the valves to be open during the move, X110 and Y100 identifies the ending position for the move as (100, 100), E1.5 identifies the length of extrusion material to be fed to the extruder, which is 1.5 mm, and F4500 identifies the speed of movement for the extruder during the move, which is 4500 mm/minute. The valve parameter P511 is equivalent to P followed by a nine-digit binary number 111111111, which is the binary representation of the decimal value 511, so all of the valves are open during this move. The controller 128 that executes the g-code in one embodiment of the system 100' and 100" is the processor that operates a DUET board, such as a DUET3D board available from Think3DPrint3D of Peterborough, UK, although other control boards and command interfaces can be used. The controller in the DUET board executes the g-code to operate the valves and actuators of the system 100' and 100" to form the layers for object formation.

The system 100' of FIG. 1 also includes an extrusion material dispensing system 212 for each heater 208 that is connected to a manifold in the extruder 108. The extrusion material from each separate supply 110 is fed to the corresponding heater 208 at a rate that maintains the pressure of the thermoplastic material in the manifold connected to the heater within a predetermined range during operation of the system 100'. The dispensing system 212 is one embodiment that is suitable for regulating pressure of the thermoplastic material in each manifold of the extruder 108". In embodiment 100" of FIG. 2, a plurality of extrusion material dispensing systems 212 are operatively connected between a plurality of extrusion material supplies 110 and a channel 232' in the heater 208' in a one-to-one correspondence. Additionally, in both embodiments, the controller 128 is operatively connected to an actuator in each dispensing system 212 to control the rate at which the dispensing system 212 delivers extrusion material from a supply 110 to the heater fed by the supply. The dispensing systems 212 of FIG. 2 can be configured as the dispensing system 212 of FIG. 1. The heaters 208 and 208' soften or melt the extrusion material 220 fed to the heater 208 via drive roller 224 (FIG. 1). Actuator 240 drives the roller 224 and is operatively connected to the controller 128 so the controller can regulate the speed at which the actuator drives the roller 224. Another roller opposite roller 224 is free-wheeling so it follows the rate of rotation at which roller 224 is driven. While FIG. 1 depicts a feed system that uses an electromechanical actuator and the driver roller 224 as a mechanical mover to move the filament 220 into the heater 208 or 208', alternative embodiments of the dispensing system 212 use one or more actuators to operate a mechanical mover in the form of a rotating auger or screw. The auger or screw moves solid phase extrusion material from a supply 110 in the form of extrusion material powder or pellets into a heater 208 or 208'.

In the embodiments of FIG. 1 and FIG. 2, each heater has a body formed from stainless steel that includes one or more heating elements 228, such as electrically resistive heating elements, which are operatively connected to the controller 128. Controller 128 is configured to connect the heating elements 228 to electrical current selectively to soften or melt the filament of extrusion material 220 in the channel or channels within the heater 208 or 208'. While FIG. 1 and FIG. 2 show heater 208 and heater 208' receiving extrusion material in a solid phase as solid filament 220, in alternative embodiments, the heaters receive the extrusion material in solid phase as powdered or pelletized extrusion material. Cooling fins 236 attenuate heat in the channels upstream from the heater. A portion of the extrusion material that remains solid in a channel at or near the cooling fins 236 forms a seal in the channel that prevents thermoplastic material from exiting the heater from any opening than the connection to the manifold 216, which maintains a temperature that keeps the extrusion material in a thermoplastic state as it enters the manifold. The extruder 108" can also include additional heating elements to maintain an elevated temperature for the thermoplastic material within each manifold within the extruder. In some embodiments, a thermal insulator covers portions of the exterior of the extruder 108" to maintain a temperature within the manifolds within the extruder. Again, the regions around the nozzles in FIG. 2 are maintained at a temperature that keeps the material in a thermoplastic state so it does not begin solidifying as it travels to the apertures in the faceplate.

To maintain a fluid pressure of the thermoplastic material within the manifolds 216 within a predetermined range, avoid damage to the extrusion material, and control the extrusion rate through the nozzles, a slip clutch 244 is operatively connected to the drive shaft of each actuator 240 that feeds filament from a supply 110 to a heater. As used in this document, the term "slip clutch" refers to a device applies frictional force to an object to move the object up to a predetermined set point. When the range about the predetermined set point for the frictional force is exceeded, the device slips so it no longer applies the frictional force to the object. The slip clutch enables the force exerted on the filament 220 by the roller 224 to remain within the constraints on the strength of the filament no matter how frequently, how fast, or how long the actuator 240 is driven. This constant force can be maintained by either driving the actuator 240 at a speed that is higher than the fastest expected rotational speed of the filament drive roller 224 or by putting an encoder wheel 248 on the roller 224 and sensing the rate of rotation with a sensor 252. The signal generated by the sensor 252 indicates the angular rotation of the roller 224 and the controller 128 receives this signal to identify the speed of the roller 224. The controller 128 is further configured to adjust the signal provided to the actuator 240 to control the speed of the actuator. When the controller is configured to control the speed of the actuator 240, the controller 128 operates the actuator 240 so its average speed is slightly faster than the rotation of the roller 224. This operation ensures that the torque on the drive roller 224 is always a function of the slip clutch torque.

The controller 128 has a set point stored in memory connected to the controller that identifies the slightly higher speed of the actuator output shaft over the rotational speed of the roller 224. As used in this document, the term "set point" means a parameter value that a controller uses to operate components to keep the parameter corresponding to the set point within a predetermined range about the set point. For example, the controller 128 changes a signal that operates the actuator 240 to rotate the output shaft at a speed identified by the output signal in a predetermined range about the set point. In addition to the commanded speed for the actuator, the number of valves opened or closed in the valve assembly 204 and the torque set point for the clutch also affect the filament drive system 212 operation. The resulting rotational speed of the roller 224 is identified by the signal generated by the sensor 252. A proportional-integral-derivative (PID) controller within controller 128 identifies an error from this signal with reference to the differential set point stored in memory and adjusts the signal output by the controller to operate the actuator 240. Alternatively, the controller 128 can alter the torque level for the slip clutch or the controller 128 can both alter the torque level and adjust the signal with which the controller operates the actuator.

The slip clutch 244 can be a fixed or adjustable torque friction disc clutch, a magnetic particle clutch, a magnetic hysteresis clutch, a ferro-fluid clutch, an air pressure clutch, or permanent magnetic clutch. The clutch types that operate magnetically can have their torque set points adjusted by applying a voltage to the clutches. This feature enables the torque set point on the clutch to be changed with reference to print conditions. The term "print conditions" refers to parameters of the currently ongoing manufacturing operation that affect the amount of thermoplastic material required in the manifold for adequate formation of the object. These print conditions include the type of extrusion material being fed to the extruder, the temperature of the thermoplastic material being emitted from the extruder, the speed at which the extruder is being moved in the X-Y plane, the position of the feature being formed on the object, the angle at which the extruder is being moved relative to the platform, and the like.

In the embodiments shown in FIG. 1 and FIG. 2, the controller 128 is configured as described above with program instructions 134, object image data 136, and extruder path control data 138 to identify a path of movement for the extruder in different regions of a layer and to transmit one or more signals to the X/Y actuators 150 to move the extruders 108' and 108" and to regulate the speed at which the extruders are moved above platform 102. The controller 128 in FIG. 1 and FIG. 2 receives extruder path control data that is modified to include transition regions that are used to establish extrusion material flow before forming a swath as discussed in more detail below. The controller 128 is configured to regulate the speed of the extruders 108' and 108" with reference to the angle of the path at which the extruders are to be moved and the orientation of the extruder faceplate as it moves along that path. The controller 128 is also configured with programmed instructions stored in a memory operatively connected to the controller that, when executed by the controller, enable the controller to generate signals for the X-Y actuators 150 that move the extruders along a path that corresponds to the transition patterns as described more fully below.

When the controller 128 receives g-code for forming a layer of an object, it identifies the regions within the layer as perimeter regions, transition regions, and interior regions. Perimeter regions correspond to the boundary for a layer or a portion of a layer. Interior regions are regions within a perimeter of the object. Transition regions are regions where the extruder is positioned for opening of the appropriate valves before the extruder is moved to a start position indicated by the g-code for formation of a swath. These transition regions enable the flow of extrusion material to reach an appropriate rate and enable extrusion material to be present on the faceplate in a proper configuration to form the next swath before swath formation begins at the position identified in the g-code for a swath.

The controller 128 is configured to identify in the g-code swaths that require the valves to be closed and the extruder lifted and moved to a swath starting position. When these swaths are identified, the controller 128 generates g-code that inserts a transition region between the end of one swath where the valves are closed and the start of the next swath that requires the lifting of the extruder. To form a layer 304 of a cylinder shown in FIG. 3, the extruder first forms the perimeter 308 by beginning at the position 312 and extruding material as the extruder opens a subset of nozzles in the extruder and continues along the perimeter path in the clockwise or counter-clockwise direction until it returns to the start position. Once the perimeter 308 is formed, the extruder continues forming swath 316 until it reaches the perimeter 308 where it moves to the right by the width of the swath and returns to the inside of the perimeter to form the swath 320. The extruder continues forming swaths back and forth in this manner until the right side of the cylinder layer is formed. At this point, the extruder must be moved to fill in the left side of the layer but this movement requires closing of the valves so material is not extruded on the portion of the layer already formed and the lifting of the extruder to prevent material on the faceplate from encountering the portion of the layer already formed. To move the extruder to the start position 324 for the next swath, the valves are closed and the extruder is lifted to a height that enables the material remaining on the faceplate from contacting other material of the part being printed. When the extruder is lowered to the start position 324, the opening of the valves and material remaining on the faceplate does not fill the region between the faceplate of the extruder and the part being printer quickly enough to form swath 328 adequately.

Figure 3:
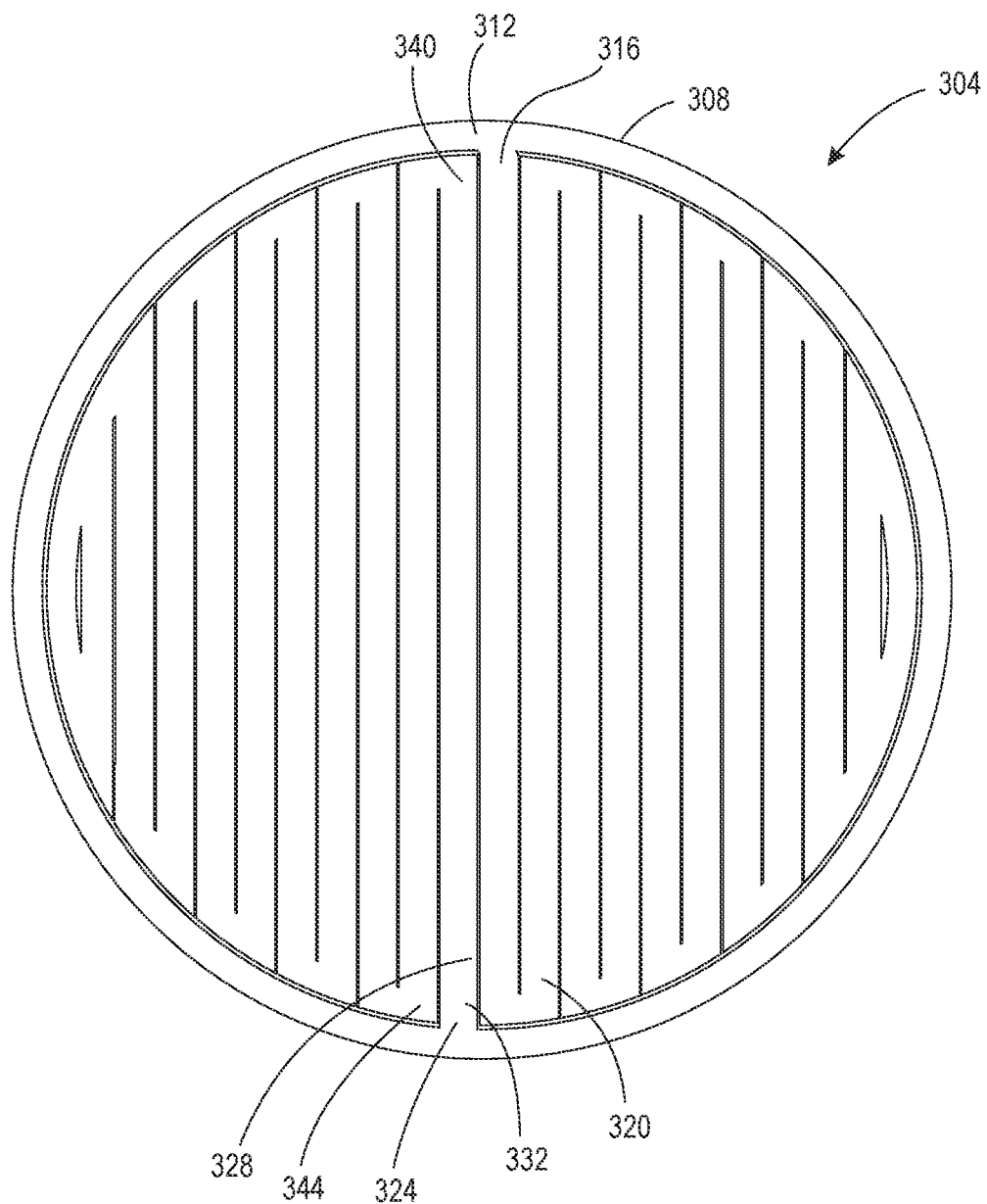
FIG. 3 illustrates a transition region in a circular layer being formed by the multi-nozzle extruder in the systems of FIG. 1 and FIG. 2.

Because extrusion material remains on the faceplate at the end of a swath, lifting of the extruder can also be required to avoid depleting material from the faceplate that was established during the last printing swath and to prevent material on the faceplate from contacting material previously extruded into the layer. Lifting of the extruder and closing of the nozzles are not needed when the extruder continuously extrudes from one swath to the next as shown in FIG. 3 or when the connecting pieces at the ends of the swaths are not formed as shown in the left portion of FIG. 3. Additionally, the extruder need not be lifted when the extruder is moved a short distance, such as a distance that is less than two times the width of the extruder or when the extruder transitions directly from a perimeter swath to an infill swath or vice versa.

To address the lag in establishing a sufficient amount of the extrusion material between the faceplate and the part being printed, the controller 128 generates and executes g-code that moves the extruder to position 332, which is offset from the start position 324 by a predetermined distance that enables the flow of the extrusion material from the nozzle to establish an adequate amount of extrusion material between the faceplate and the part once the extruder reaches position 324. This predetermined distance depends upon the viscosity of the extrusion material and the speed at which the extruder is moved from position 332 to position 324. In one embodiment, this distance corresponds to a distance across the faceplate of the extruder in the direction that the extruder moves from position 332 to position 324. When the extruder reaches position 324, the extrusion material between the faceplate and the part is reestablished and the controller 128 executes the g-code for forming the first swath 328 of the left portion of the layer. Thus, it reverses its direction and goes over position 332 as it continues toward the perimeter to position 340. Once there, the extruder moves to the left by a distance that corresponds to the width of the swath and then continues across the interior of the cylinder to position 344. As noted above with the right side of the layer, this back and forth motion continues until the left side of the layer is completed, the valves are closed, and the extruder is lifted before executing the g-code for formation of the next layer.

This placement of the extruder at an offset distance from a swath start position, opening the valves indicated by g-code for the swath to be formed, moving the extruder to the swath start position, and then continuing to move the extruder to form the swath is useful for a number of situations encountered in object formation. Once such situation is perimeter formation. In forming the perimeter 308, for example, the extruder is moved to a position in the interior region that is approximately one-half of the distance across the faceplate when the extruder moves in the clockwise circle to form the perimeter. At this position, the valves identified in the g-code for the perimeter swath are opened and the extruder is moved to the starting position for the perimeter swath. Typically, the movement from the offset position to the perimeter swath start position is perpendicular to the movement used to form the perimeter but other angles can be used. Once it reaches the perimeter swath position, the extruder follows the clockwise path and forms the perimeter swath. Another situation where this type of operation is useful is corner formation. In this situation, the extruder is positioned at an offset from the corner start position that is within the perimeter of the corner. The valves are then opened and moved to the corner start position from where the extruder is moved to form the corner. In this maneuver, no valves are opened that permit material to be extruded on the exterior of the corner.

Figure 4:
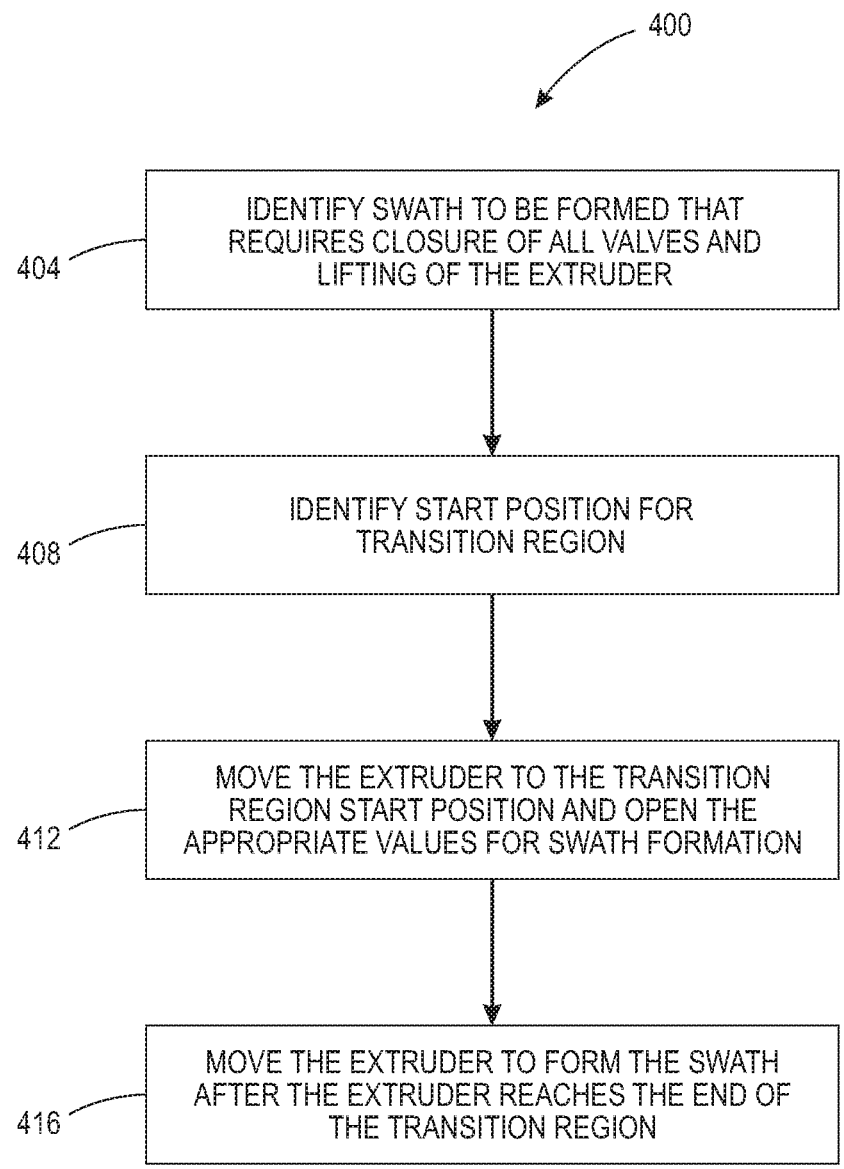
FIG. 4 is a flow diagram of a process used by the controllers of the additive manufacturing systems of FIG. 1 and FIG. 2 to enable extrusion material flow to be established when an extruder reaches a start position for formation of a swath.

In general, the process 400 shown in FIG. 4 is performed to enable extrusion material flow to be established when an extruder reaches a start position for formation of a swath. In the discussion below, a reference to the process 400 performing a function or action refers to the operation of a controller, such as controller 128, to execute stored program instructions and extruder path control data to perform the function or action in association with other components in the printer. The process 400 is described in conjunction with the printer 100' of FIG. 1 and printer 100" of FIG. 2 for illustrative purposes.

The process 400 begins with the controller identifying a swath formation that requires closure of all valves and lifting of the extruder before it is moved to a start position for the swath (block 404). The controller identifies a transition region start position that is offset from the swath start position and is positioned within the perimeter of an object region (block 408). As used in this document, the term "transition region" means an area in which an extruder is operated to enable extrusion material flow to be established before the extruder reaches the swath start position. Once the extruder reaches the transition region start position, the valves identified for formation of the swath are opened and the extruder is moved through the transition region to the swath start position (block 412). From there, the object formation control data are executed to form the swath (block 416).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for operating a three-dimensional (3D) object manufacturing system comprising:
   identifying with a controller a swath to be formed in a layer that requires closing of every valve in a plurality of valves in an extruder and lifting of the extruder above a previously formed portion of the layer before moving the extruder to a start position for formation of the swath in the layer;
   identifying with the controller a transition region start position that is offset from the start position for the swath and is positioned within a perimeter of an object being formed by the 3D object manufacturing system;
   operating the extruder to close every valve in the plurality of valves in the extruder;
   operating at least one actuator with the controller to lift the extruder above the previously formed portion of the layer and position the extruder at the transition region start position;
   opening, with the controller, valves in the extruder that are identified by extruder path control data for formation of the swath to be formed in the layer; and
   operating the at least one actuator with the controller to move the extruder with the valves identified by the extruder path control data open from the transition region start position to the start position for the swath to fill a volume between a faceplate of the extruder and the portion of the object being formed by the 3D manufacturing system at the start position for the swath.

2. The method of claim 1, the identification of the transition region start position further comprises:
   identifying with the controller the transition region start position as being offset from the start position for the swath toward an interior of an area within the perimeter; and
   the operation of the at least one actuator with the controller moves the extruder from the interior of the area within the perimeter toward the perimeter to the start position for the swath.

3. The method of claim 1 further comprising:
   continuing to operate the at least one actuator with the controller using the extruder path control data to form the swath once the extruder reaches the start position for the swath.

4. The method of claim 3 wherein the offset from the start position for the swath is determined with reference to a speed identified by the extruder path control data for formation of the swath and a viscosity of material extruded by the extruder.

5. The method of claim 3 wherein the offset from the start position for the swath corresponds to a distance across a faceplate of the extruder in a direction that the extruder moves to form the swath once the extruder reaches the start position for the swath.

6. The method of claim 5 wherein the offset from the start position for the swath corresponds to one-half of a distance across the faceplate of the extruder in the direction in which the extruder moves to form the swath once the extruder reaches the start position for the swath.

7. The method of claim 5 wherein the offset from the start position for the swath corresponds to one-half of the distance across the faceplate of the extruder in a direction that is perpendicular to the direction in which the extruder moves to form the swath once the extruder reaches the start position for the swath.

8. The method of claim 4 further comprising:
   operating the at least one actuator with the controller to move the extruder from the transition region start position to the start position for the swath in a direction that is perpendicular to a direction in which the extruder head moves after the extruder leaves the start position for formation of the swath.

9. The method of claim 4 further comprising:
   operating the at least one actuator with the controller to move the extruder from the transition region start position to the start position for the swath in a direction that is a reverse direction in which the extruder head moves after the extruder leaves the start position for formation of the swath.

10. The method of claim 4 wherein the transition region start position is offset from the start position for the swath and the swath to be formed includes a corner.

11. The method of claim 10 wherein the transition region start position is within the corner in the swath to be formed.

12. The method of claim 11 further comprising:
operating with the controller multiple valves to be used for formation of the swath that includes the corner.

13. The method of claim 12 further comprising:
operating with the controller the multiple valves to be used for formation of the swath that includes the corner as the extruder is moved from the transition region start position to the start position for the swath.

* * * * *